United States Patent [19]

Ushigome

[11] Patent Number: 5,523,153
[45] Date of Patent: Jun. 4, 1996

[54] MAGNETIC RECORDING MEDIUM

[75] Inventor: Hisasi Ushigome, Osaka, Japan

[73] Assignee: Matsushita Electric Industrial Co., Ltd., Osaka-Fu, Japan

[21] Appl. No.: 381,279

[22] Filed: Jan. 31, 1995

Related U.S. Application Data

[63] Continuation of Ser. No. 130,832, Oct. 4, 1993, abandoned.

[30] Foreign Application Priority Data

Oct. 2, 1992 [JP] Japan .................................. 4-264533

[51] Int. Cl.$^6$ ................................ G11B 5/66; B32B 5/16
[52] U.S. Cl. .................... 428/323; 428/327; 428/328; 428/694 B; 428/694 BU; 428/694 BN; 428/694 BR; 428/704; 428/900
[58] Field of Search ................. 428/694 B, 694 BU, 428/694 BN, 694 BR, 704, 900, 323, 327, 328

[56] References Cited

U.S. PATENT DOCUMENTS

| | | | |
|---|---|---|---|
| 3,440,091 | 4/1969 | Delmore | 428/900 |
| 4,336,308 | 6/1982 | Yamada | 428/425.9 |
| 4,772,522 | 9/1988 | Kubota | 428/328 |
| 5,079,096 | 1/1992 | Miyake | 428/500 |

*Primary Examiner*—Leszek Kiliman
*Attorney, Agent, or Firm*—Wenderoth, Lind & Ponack

[57] ABSTRACT

A magnetic recording medium having a non-magnetic substrate and a magnetic layer prepared by coating a magnetic paint on the substrate, wherein the magnetic layer contains inorganic electrically conductive particles and an electro-conductive polymer, has a high content of magnetic powder and a low surface electrical resistance.

5 Claims, 1 Drawing Sheet

MAGNETIC RECORDING MEDIUM

This application is a continuation of now abandoned application Ser. No. 08/130,832, filed Oct. 4, 1993.

BACKGROUND OF THE INVENTION

1. Field of the Invention

The present invention relates to a magnetic recording medium, particularly to a floppy disk having a high content of magnetic powder and a low surface electrical resistance of a magnetic layer.

2. Description of Related Art

Recently, the development of a floppy disk (referred to as "FD" hereinafter) is remarkably proceeded and it has been is required that the floppy disk have a higher recording density and a larger capacity. With an increase of capacity, high reliability of recording/reproduction is strongly required. One of factors deteriorating the reliability of the FD is adhesion of dust to the magnetic layer surface. The degree of adhesion of dust depends on the surface electrical resistance of the magnetic layer. When the magnetic layer has a high surface electrical resistance, the magnetic layer surface is easily charged so that the dust in the air easily adheres to the surface. The adhered dust is a main reason for the missing pulse (MP). In order to increase the reliability of the FD, the magnetic layer should have a low surface electrical resistance (preferably smaller than $5 \times 10^7 \Omega/\square$).

In the prior art, the magnetic layer frequently contains carbon black so as to decrease the surface electrical resistance of the magnetic layer. The volume fraction of carbon black should be large enough to provide a sufficiently low surface electrical resistance. However, the increase of the volume fraction of carbon black gives an unsuitable decrease in the volume fraction of the magnetic powder in view of the electromagnetic conversion property. Thus, carbon black is excluded from the magnetic layer, and an electrically conductive anchor layer (electrically conductive resin layer) containing carbon black is formed under the magnetic layer so that the surface electrical resistance of the magnetic layer is decreased. In addition, a coated electroconductive polymer (for example, polyaniline) layer is substituted for the electrically conductive anchor layer. However, the electroconductive polymer layer has poor adhesion to a polyethylene terephthalate (PET) base film, and it is necessary to form a firm grip layer between the electroconductive polymer layer and the base film, which firm grip layer facilitates a firm connection of the electroconductive polymer layer with the base film. The multiple layer-coating of the firm grip layer, the electroconductive polymer layer and the magnetic layer decreases the productivity, gives a low yield and increases the cost of the recording medium. Therefore, in order to decrease the surface electrical resistance of the magnetic recording medium, a new technology was sought which is easy, has high productivity and decreases the production cost. On the other hand, it is not necessary to make an effort so as to decrease the surface electrical resistance of the magnetic layer of a video tape having a back coating layer. The reason is that the back coating layer containing carbon black has a sufficiently low electrical resistance and consequently the magnetic layer on the opposite side has a low surface electrical resistance when the base film is thin. However, for the magnetic recording medium having two magnetic layers between which the base film is present, such as the FD, it is necessary to decrease the electrical resistance of the magnetic layer itself. The inherent electrical resistance of Ba ferrite magnetic powder itself used for the FD having high recording density and large capacity is remarkably higher than that of magnetic metal powder. Therefore, the technology decreasing the surface electrical resistance of the magnetic layer is particularly required in the development of the large capacity FD.

In the prior art, a means for remarkably and drastically decreasing the surface electrical resistance of the magnetic layer has not been developed, and there is no literature or patent specification disclosing such means.

In the prior art, the problems of low productivity and high cost cannot be solved. In order to obtain the FD having the high recording density and the large capacity, it is necessary to use a high content of Ba ferrite magnetic powder in the magnetic layer. Thus, the magnetic layer disadvantageously has too high a surface electrical resistance of the magnetic layer.

SUMMARY OF THE INVENTION

The present invention solves the above problems, and achieves the high content of the magnetic powder as well as the low surface electrical resistance of the magnetic layer. An object of the present invention is to provide a FD having an excellent electromagnetic conversion property and running reliability.

The present invention provides a magnetic recording medium comprising a non-magnetic substrate and a magnetic layer prepared by coating a magnetic paint on the substrate, wherein the magnetic layer contains inorganic electrically conductive particles and an electroconductive polymer.

DETAILED DESCRIPTION OF THE INVENTION

Figure 1:
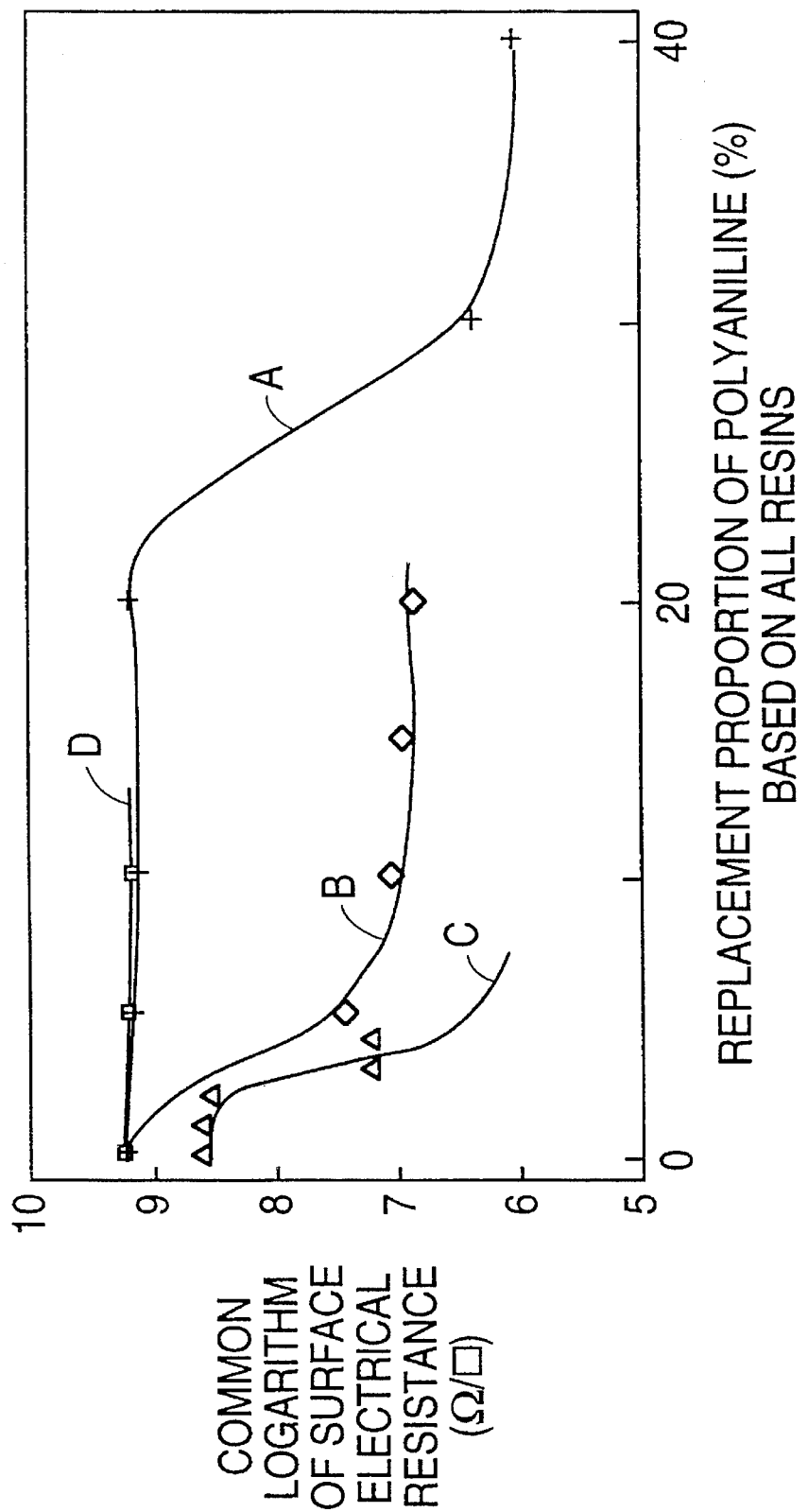
FIG. 1 is a graph showing the relationship between the surface electrical resistance and the replacement proportion of the polyaniline in the tests of Examples 1–3 and Comparative Example 1.

If a distance between the carbon black particles is smaller than a given threshold value in the coating film containing carbon black, the electron jumps by a tunnel effect so that the electrical resistance of the coating film sharply drops. The electroconductive polymer has good electrical conductivity when a dopant is provided. The polyaniline polymer included in the electroconductive polymer has a one-dimensional linear rigid polymer structure and an electron can easily move in the direction of polymer backbone. Namely, it is supposed that the electroconductive polymer such as polyaniline acts as acicular organic carbon black. Even in the-case that the distance between the carbon black particles is larger than the threshold value, if the carbon black particles are shortcircuited by means of the doped electroconductive polymer, the electrical resistance of the coating film decreases so that the surface electrical resistance of the coating film also decreases.

The magnetic layer according to the present invention usually comprises the inorganic electrically conductive particles, the electroconductive polymer, magnetic powder, a binder resin and an additive.

Specific examples of the inorganic electrically conductive particles are carbon black, $TiO_2$—$SnO_2$ (for example, Sb-doped $TiO_2$—$SnO_2$), $ZnO$, $SnO_2$ (for example, Sb-doped $SnO_2$) and $TiO_x$. A volume fraction of the inorganic electrically conductive particles is usually from 0.1 to 10%, preferably from 0.5 to 8%, more preferably from 1.0 to 5.0%, based on the magnetic layer. An average particle size of the inorganic electrically conductive particles is usually from 0.05 to 0.5 μm.

Specific examples of the electroconductive polymer are polyaniline, polyacetylene, poly-p-phenylene, polyphenylene vinylene, polyphenylene sulfide, polypyrrole, polythiophene, poly(3-methylthiophene), polyperinaphthalene, polyacrylonitrile, polyoxadiazole and poly[Fe phthalocianine (tetrazine)]. A volume fraction of the electroconductive polymer is usually from 1 to 40 %, preferably from 5 to 20%, based on total volume of the binder resin and the electroconductive polymer.

The electroconductive polymer may contain a dopant. Specific examples of the dopant are acids such as p-toluenesulfonic acid monohydrate. An amount of the dopant is usually from 1 to 200 parts by weight, preferably from 50 to 100 parts by weight per 100 parts by weight of the electroconductive polymer.

Specific examples of the magnetic powder are Ba ferrite, $CrO_2$, $\gamma$-$Fe_2O_3$, Co—$Fe_2O_3$, $Fe_mN_n$ and $Fe_mC_n$. An amount of the magnetic powder is usually from 30 to 90 parts by weight, preferably from 50 to 85 parts by weight per 100 parts by weight of the magnetic layer.

Specific examples of the binder resin are polyurethane, poly(vinyl chloride) and nitrocellulose. An amount of the binder resin is usually from 5 to 500 parts by weight, preferably from 10 to 90 parts by weight per 100 parts by weight of the magnetic powder.

The additive may be a lubricant, a curing agent, a curing catalyst and a dispersant. Specific examples of the additive are alumina, carbon black, a fatty acid, a fatty acid ester. An amount of the lubricant is usually from 2 to 25 parts by weight, preferably from 5 to 15 parts by weight per 100 parts by weight of on the magnetic layer. An amount of the curing agent is usually from 1 to 5 parts by weight, preferably from 1.5 to 4.5 parts by weight per 100 parts by weight of on the magnetic layer. An amount of the curing catalyst is usually from 0.01 to 0.05 parts by weight, preferably from 0.02 to 0.04 parts by weight per 100 parts by weight of on the magnetic layer.

The magnetic recording medium can be prepared, for example, by preparing a magnetic paint containing the inorganic electrically conductive particles and the electroconductive polymer, coating the magnetic paint on a base film, and drying the coating no prepare a magnetic layer. The base film may be polyester such as polyethylene terephthalate.

PREFERRED EMBODIMENT OF THE INVENTION

The present invention will be illustrated by the following Examples. The Examples will be illustrated by the FD comprising the Ba ferrite magnetic powder.

Example 1 to 3 and Comparative Example 1

A mixture of

Ba ferrite magnetic powder (manufactured by Toshiba Corp., BET value: 30.8 $m^2$/g) 6,000 g, Vinyl chloride copolymer resin (manufactured by Nippon Zeon Co., Ltd, type: MR-110) (solid content) 720 g, and Solvent mixture (MEK/toluene/cyclohexanone=3/3/1 (weight ratio)) 6,662 g was kneaded by a planetary mixer, and then diluted to NV (a weight ratio of nonvolatile components in a paint) of 50.0% with the above solvent mixture. This magnetic paint was dispersed by a sand mill (primary dispersion). An alumina paste and a carbon paste were added to prepare a composition. An amount of alumina in the alumina paste was 120 g and an amount of carbon black in the carbon paste was shown in Table 1. The alumina paste was previously prepared by mixing $\alpha$-alumina (manufactured by Sumitomo Chemical Co., Ltd., type: AKP-30) with a polyurethane resin (referred to as "PU resin" hereinafter) (manufactured by Toyobo Co., Ltd., type: UR-8530) in a solid content ratio of alumina/resin of 6/1 by a sand mill to give a dispersion. In the same manner, the carbon paste was previously prepared by mixing carbon black (manufactured by Mitsubishi Chemical Co. Ltd., type: #3950B, BET value: 1,500 $m^2$/g) with the above PU resin in a solid content ratio of carbon black/resin of 1/1 by a kneader and a sand mill to give a dispersion. The composition was further dispersed by a sand mill (secondary dispersion) and a polyaniline [to which a dopant (p-toluenesulfonic acid monohydrate, 50 parts by parts by weight of polyaniline) was added]was added in various amounts shown in Table 1. The tests in which the amounts of carbon black are 1.0, 2.5 and 3.0 parts by weight per 100 parts by weight of the magnetic powder are Example 1, Example 2 and Example 3, respectively. No addition of carbon black is Comparative Example 1. A proportion of replacement of resins with the polyaniline polymer (a volume ratio of the polyaniline polymer to all resins including the polyaniline polymer) is shown in Table 1.

TABLE 1

| Example No. | Amount of carbon black (parts by weight) (magnetic powder = 100) | Replacement proportion (%) of electrically conductive polyaniline polymer | | | | |
|---|---|---|---|---|---|---|
| | | (1) | (2) | (3) | (4) | (5) |
| 1 | 1.0 | 0.0 | 8.94 | 21.0 | 31.38 | 41.57 |
| 2 | 2.5 | 0.0 | 4.96 | 9.93 | 14.91 | 19.88 |
| 3 | 3.0 | 0.0 | 1.00 | 2.00 | 3.00 | 4.00 |
| Com. 1 | 0 | 0.0 | 5.0 | 10.0 | — | — |

At this time, said PU resin was additionally added and the addition amounts of polyaniline and the PU resin were controlled so that the total amount of all resins is the same and only the replacement proportion of polyaniline changes in the given amount of carbon black. Then the dispersion was intimately stirred by a mixer and filtered. Each of a lubricant, a curing agent and a curing catalyst was added in the following amount per 100 parts by weight of the magnetic powder.

| | Parts by weight |
|---|---|
| Fatty acid: stearic acid | 1 |
| Fatty acid: oleic acid | 1 |
| Fatty acid ester: oleyl oleate | 4 |
| Fatty acid ester: butoxyethyl stearate | 1 |
| Curing agent: manufactured by Nippon polyurethane Ltd., type: H-101 | 2 |
| Curing catalyst: di-n-butyltin-di-laurate | 0.03 |

In addition, a solvent mixture of MEK/toluene/cyclohexanone (3/3/1 (weight ratio)) was added so that NV was 37.0 to prepare all the test paints. The resultant magnetic paint was coated on one side of a PET base film having a thickness of 62 μm and dried, and then coated on an opposite side of the base film and dried. After the both sides of the base film were calendered to smoothen the surfaces, the base film was thermally treated at 60° C. for 24 hours. The resultant magnetic recording medium was stamped to a disk and the surfaces of the disk were polished. The disk was attached to a shell to prepare a 3.5 inch FD having a magnetic layer thickness of 2.5 μm.

The surface electrical resistance value of the magnetic layer of the sample FD was measured as follows:

Using a high electrical resistance measuring machine (manufactured by YHP Ltd., type: 4329A), the surface electrical resistance was measured under a measuring voltage of 25 V, a sample width of 1.5 cm and a distance between terminals of 5.0 cm. A surface electrical resistance value was calculated according the equation:

$$\text{Surface electrical resistance value} = 1.5 \times 2 \times A/5 = 0.6 \times A$$

(Unit: $\Omega/\square$) ($A$: reading value (unit: $\Omega$))

Carbon black used in the Examples is studied.

Carbon black has a primary particle size of 160 Å and is usually present in a form of an aggregate which has a particle size of 510 Å. A volume (=V) of the aggregate and a length (=L) of one edge of a cube in the coating film containing one aggregate can be calculated as follows:

V (unit: Å$^3$)=4/3×π×(510/2)$^3$≈6.95×10$^7$

L (unit: Å)=cubic root of (6.95×10$^7$/(C/100))

(C (%): Volume fraction of carbon black based on the coating film)

Therefore, a distance (=D) between surfaces of the carbon black aggregates is calculated by subtracting a double value of a radius of a primary particle from L as follows:

D (unit: Å)=L−150

Next, the electrically conductive polyaniline polymer is studied.

A weight average molecular weight (Mw) and a number average molecular weight (Mn) of the polyaniline polymer are 150,000 and 15,000, respectively. A molecular weight and a length of a monomer are 364 and about 24 Å, respectively. Accordingly, the polymerization degree derived from the Mn is 41.2 (=15,000/364) so that the length of the polymer is about 990 Å(=24×41.2).

A volume fraction of carbon black based on the coating film is calculated from the density and the amount (parts by weight) of each material and the distance (=D) between the surfaces of the carbon black aggregates can be calculated in each amount (part by weight) of carbon black. The results are shown in Table 2.

TABLE 2

| Example No. | Carbon black | | | |
|---|---|---|---|---|
| | Parts by weight | Volume fraction | Distance between surfaces of aggregates (Å) | Symbol in FIG. 1 |
| 1 | 1.0 | 1.406 | 1193 | A |
| 2 | 2.5 | 3.338 | 767 | B |
| 3 | 3.0 | 3.940 | 698 | C |

TABLE 2-continued

| Example No. | Carbon black | | | |
|---|---|---|---|---|
| | Parts by weight | Volume fraction | Distance between surfaces of aggregates (Å) | Symbol in FIG. 1 |
| Com. 1 | 0 | 0 | — | D |

As apparent from the above results, the length of the electroconductive polyaniline polymer is almost the same as the value of the distance between the surfaces of carbon black aggregates.

The relationship between the surface electrical resistance and the replacement proportion of the polyaniline polymer is shown in a graph of FIG. 1. In this graph, the abscissa is the replacement proportion of the electroconductive polyaniline polymer based on all resins including the electroconductive polyaniline polymer and the ordinate is the common logarithm of surface electrical resistance ($\Omega/\square$). The curves A-D passing through the measured values show the amount (parts by weight) of the carbon black.

From FIG. 1, the following facts are understood.

1. In the case that the carbon black amount is 1.0 part by weight, when the replacement proportion of the polyaniline polymer is low, the surface electrical resistance is unchanged, but when the replacement proportion of polyaniline polymer is larger values of 30% and 40%, the surface electrical resistance decreases (Example 1).

2. In the case that the carbon black amount is 2.5 parts by weight, when the replacement proportion is 5%, the surface electrical resistance decreases by two orders of magnitude (Example 2).

3. In the case that the carbon black amount is 3.0 parts by weight, the surface electrical resistance sharply drops when the replacement proportion is between 2% and 3% (Example 3).

4. In the case of no addition of carbon black, even when up to 10% of the resin is replaced with the polyaniline polymer, the surface electrical resistance is unchanged (Comparative Example 1).

It is supposed that the carbon black aggregates are crosslinked with electroconductive polyaniline polymer having a linear one-dimensional structure so that the aggregates are electrically shortcircuited to decrease the surface electrical resistance value. This supposition is based on the results of the experiments and supported by the above theoretical calculations.

Therefore, it is apparent that the surface electrical resistance of the magnetic coating film can be controlled by the amount (part by weight) of carbon black and the replacement proportion of the electroconductive polyaniline polymer. An important discovery is that the surface electrical resistance can be remarkably decreased by the low amount of carbon black and the low replacement proportion of the electroconductive polyaniline polymer based on the total amount of the resins. Therefore, both of the high content of Ba ferrite magnetic powder having the large inherent electrical resistance value and the low surface electrical resistance of the magnetic layer can be achieved.

According to the present invention, the high content of the magnetic powder and the low surface electrical resistance can be achieved by containing the inorganic electrically conductive particles and the electroconductive polymer in the magnetic layer. The surface electrical resistance can be controlled by changing a content ratio of the inorganic electrically conductive particles to the electroconductive polymer. The present invention is not limited to the magnetic layer and can be also applied to a back coating layer, an anchor layer present under the magnetic layer and an anchor layer present under the back coating layer. The magnetic layer may be coated directly on the base film of nonmagnetic substrate or indirectly through an easy adhesive layer. The present invention is not limited to the magnetic recording medium and can be used in the electrically conductive resin application using an electrically conductive filler and an electroconductive polymer.

What is claimed is:

1. A magnetic recording medium comprising a nonmagnetic substrate and a magnetic layer prepared by coating a magnetic paint on the substrate, wherein the magnetic layer comprises magnetic powder, a binder resin, an additive, inorganic electrically conductive particles and an electroconductive polymer, and wherein the electroconductive polymer is present in an amount of from 1 to 40% based upon the total volume of the binder resin and the electroconductive polymer.

2. The magnetic recording medium according to claim 1, wherein the inorganic electrically conductive particles are selected from the group consisting of carbon black, $TiO_2$—$SnO_2$, $ZnO$, $SnO_2$ and $TiO_x$.

3. The magnetic recording medium according to claim 1, wherein the inorganic electrically conductive particles are present in a volume fraction of from 0.1 to 10% based on the magnetic layer.

4. The magnetic recording medium according to claim 1, wherein the electroconductive polymer is selected from the group consisting of polyaniline, polyacetylene, poly-p-phenylene, polyphenylenevinylene, polyphenylene sulfide, polypyrrole, polythiophene, poly(3-methylthiophene), polyperinaphthalene, polyacrylonitrile, polyoxadiazole and poly [Fe phthalocianine (tetrazine)].

5. The magnetic recording medium according to claim 1, wherein the additive is at least one selected from the group consisting of lubricant, curing agent, curing catalyst and dispersant.

* * * * *